(12) United States Patent
Busse et al.

(10) Patent No.: US 9,739,951 B2
(45) Date of Patent: Aug. 22, 2017

(54) FIBER-OPTIC CONNECTION ARRANGEMENT AND ADAPTER SLEEVE

(71) Applicant: CommScope Technologies LLC, Hickory, NC (US)

(72) Inventors: Ralf-Dieter Busse, Hoppegarten (DE); Wolfgang Kraft, Berlin (DE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 15/093,895

(22) Filed: Apr. 8, 2016

(65) Prior Publication Data

US 2016/0291260 A1    Oct. 6, 2016

Related U.S. Application Data

(63) Continuation of application No. 14/524,352, filed on Oct. 27, 2014, now Pat. No. 9,310,570, which is a
(Continued)

(30) Foreign Application Priority Data

Feb. 17, 2011    (DE) .......... 10 2011 011 523

(51) Int. Cl.
    *G02B 6/38*    (2006.01)
(52) U.S. Cl.
    CPC ......... *G02B 6/3825* (2013.01); *G02B 6/3807* (2013.01); *G02B 6/3826* (2013.01);
(Continued)
(58) Field of Classification Search
    CPC .. G02B 6/3825; G02B 6/3807; G02B 6/3826; G02B 6/3849; G02B 6/3879; G02B 6/3894; G02B 6/3893
(Continued)

(56) References Cited

U.S. PATENT DOCUMENTS 4,493,529 A    1/1985    Doty
4,793,683 A    12/1988    Cannon et al.
(Continued)

FOREIGN PATENT DOCUMENTS

GB    2 062 283    5/1981
JP    52-16240    2/1977

OTHER PUBLICATIONS

International Search Report for International Application No. PCT/IB2012/000255 mailed Jul. 31, 2012. (3 pages).

*Primary Examiner* — Ellen Kim
(74) *Attorney, Agent, or Firm* — Merchant & Gould P.C.

(57) ABSTRACT

The invention relates to a fiber-optic connection arrangement, with the connection arrangement (21) comprising a fiber-optic adapter (2), with the fiber-optic adapter (2) having a first connecting device (38) for a first connecting plug (11) and a second connecting device (6) for a second connecting plug (17), with the first and the second connecting devices (38, 6) being different, with the fiber-optic adapter (2) having at least one first adapter-side attachment means, with the first adapter-side attachment means being in the form of an external thread (8) with a first adapter-side nominal diameter, wherein the connection arrangement (21) furthermore comprises an adapter sleeve (26), with the adapter sleeve (26) having a first end section (27) with a first opening (28), and a second end section (29) with a second opening (30), with the first end section (27) having a first sleeve-side attachment means, with the first sleeve-side attachment means being in the form of a first internal thread (36), with the first internal thread (36) having a first sleeve-side nominal diameter,
with the first sleeve-side nominal diameter corresponding to the first adapter-side nominal diameter, with the adapter sleeve (26) being screwed onto the adapter-side external thread (8) such that at least the second connecting device (6)

(Continued)

is arranged in an internal volume (47) in the adapter sleeve (26). The invention also relates to an adapter sleeve (26).

13 Claims, 5 Drawing Sheets

Related U.S. Application Data continuation of application No. 14/000,018, filed as application No. PCT/IB2012/000255 on Feb. 10, 2012, now Pat. No. 8,882,364.

(52) U.S. Cl.
CPC ......... *G02B 6/3849* (2013.01); *G02B 6/3879* (2013.01); *G02B 6/3894* (2013.01); *G02B 6/3893* (2013.01)

(58) Field of Classification Search
USPC .............................................. 385/58–62, 87
See application file for complete search history.

(56) References Cited

U.S. PATENT DOCUMENTS

| | | |
|---|---|---|
| 5,115,484 A | 5/1992 | Johnson |
| 5,590,229 A | 12/1996 | Goldman et al. |
| 6,206,579 B1 | 3/2001 | Selfridge et al. |
| 6,305,849 B1 | 10/2001 | Roehrs et al. |
| 6,416,334 B1 | 7/2002 | Plishner |
| 6,579,014 B2 | 6/2003 | Melton et al. |
| 6,648,520 B2 | 11/2003 | McDonald et al. |
| 6,652,156 B2 | 11/2003 | Shinagawa et al. |
| 6,739,759 B1 | 5/2004 | Seeley |
| 6,962,445 B2 | 11/2005 | Zimmel et al. |
| 7,090,407 B2 | 8/2006 | Melton et al. |
| 7,137,742 B2 | 11/2006 | Theuerkorn et al. |
| 7,264,402 B2 | 9/2007 | Theuerkorn et al. |
| 7,744,288 B2 | 6/2010 | Lu et al. |
| 7,785,015 B2 | 8/2010 | Melton et al. |
| 7,785,016 B2 | 8/2010 | Luther et al. |
| 7,881,576 B2 | 2/2011 | Melton et al. |
| 7,918,609 B2 | 4/2011 | Melton et al. |
| 7,959,361 B2 | 6/2011 | Lu et al. |
| 8,137,002 B2 | 3/2012 | Lu et al. |
| 8,480,312 B2 | 7/2013 | Smith et al. |
| 8,882,364 B2 | 11/2014 | Busse et al. |
| 8,894,300 B2 | 11/2014 | Smith et al. |
| 9,310,570 B2 | 4/2016 | Busse et al. |
| 2004/0038588 A1 | 2/2004 | Bernardi et al. |
| 2005/0041928 A1 | 2/2005 | Zimmel et al. |
| 2005/0232553 A1 | 10/2005 | Holmquist |
| 2011/0200286 A1 | 8/2011 | Smith et al. |
| 2013/0028569 A1* | 1/2013 | Kempeneers ........ G02B 6/4471 385/139 |

* cited by examiner

FIBER-OPTIC CONNECTION ARRANGEMENT AND ADAPTER SLEEVE

This application is a Continuation of U.S. Ser. No. 14/524,352, filed 27 Oct. 2014, now U.S. Pat. No. 9,310,570, which is a Continuation of U.S. Ser. No. 14/000,018, filed 16 Aug. 2013, now U.S. Pat. No. 8,882,364, which is a National Stage Application of PCT/IB2012/000255, filed 10 Feb. 2012, which claims benefit of Serial No. 10 2011 011 523.4, filed 17 Feb. 2011 in Germany and which applications are incorporated herein by reference. To the extent appropriate, a claim of priority is made to each of the above disclosed applications.

BACKGROUND

The invention relates to a fiber-optic connection arrangement and to an adapter sleeve.

U.S. Pat. No. 7,744 288 B2 discloses a fiber-optic adapter. The fiber-optic adapter is used to connect a first glass fiber cable with a first connecting or end plug and a second glass fiber cable with a second connecting or end plug, with the first connecting or end plug and the second connecting or end plug being different. This makes it possible to connect glass fiber cables which are terminated with different plug types.

For this purpose, the fiber-optic adapter has a first connecting device for the first connecting or end plug and a second connecting device for the second connecting or end plug. Because the first and the second connecting or end plugs are of different types, the first and the second connecting devices are also of different types.

In particular, the fiber-optic adapter which is proposed in U.S. Pat. No. 7,744,288 B2 can be used to connect an external glass fiber cable to an internal glass fiber cable. In this case, an external glass fiber cable means a glass fiber cable which is laid in an outdoor area and is subject, for example, to environmental influences, for example to changing weather conditions, moisture, dirt and further environmental influences. In contrast to this, an internal glass fiber cable means a cable which is laid in an indoor area and is not subject to such environmental influences, or only to a minor extent. The requirements and characteristics of internal and external cables are correspondingly different.

In particular, the fiber-optic adapter may have a first connecting device for a connecting plug with a so-called resistance capability, for example a so-called DLX™ plug. Connecting plugs such as these are designed for use in an outdoor area, for example outside buildings, that is to say for outdoor use. In this case, the connecting plug with resistance capability and the first connecting device can be designed such that the fiber-optic adapter allows a fluid-tight connection between an external glass fiber cable, which is laid in an outdoor area, and an internal glass fiber cable, which is laid in an indoor area. Fiber-optic adapters such as these can therefore preferably be used in the area of junctions between an outdoor area and an indoor area, for example in the area of passages through building walls.

However, one disadvantage in this case is that, until now, sealing has been arranged only with respect to the external surrounding area, that is to say in the area of the first connecting device, because the second connecting device, when the fiber-optic adapter has been used as described above, has generally been arranged in an indoor area and has therefore been not subject to any, or only to minimal, external environmental influences, such as moisture. A further disadvantage is that only different types of connecting or end plugs can be connected by means of the known fiber-optic adapter. For example, at the moment, it is therefore impossible to reliably connect two glass fiber cables using connecting or end plugs of the same type.

This raises the technical problem of providing a fiber-optic connection arrangement and an adapter sleeve which allow a connection, protected against environmental influences, between connecting or end plugs of different types or of the same type for glass fiber cables, in which case the aim is not to modify a design of a fiber-optic adapter for connection of two glass fiber cables equipped with connecting or end plugs of different types.

A fiber-optic connection arrangement is proposed. The connection arrangement comprises a fiber-optic adapter for example as described in U.S. Pat. No. 7,744,288 B2. In particular, the fiber-optic adapter has a first connecting device for a first connecting plug and a second connecting device for a second connecting plug. In this case, a connecting device is used for mechanical fixing and/or alignment of a connecting plug which terminates a glass fiber cable. By way of example, a connecting device may have suitable attachment means for this purpose, for example latching, clamping and/or screw elements. Alternatively or cumulatively, the connecting device may have guide means, for example guide grooves, guide webs, guide clips and guide walls. In particular, the fiber-optic adapter may be used to connect an external glass fiber cable and an internal glass fiber cable. For this purpose, the fiber-optic adapter may have an outer section and an inner section, with an outer section being designed and configured such that it complies with the requirements which result from external environmental influences, and can be arranged in an outdoor area. In this case, the inner section can be designed and configured such that it can be arranged in an indoor area, which is not subject to external environmental influences, or only to a reduced extent. In this case, the outer section may have the first connecting device and the inner section the second connecting device. In this case, a connecting plug with a resistance capability preferably has the capability to be inserted into the first connecting device. A connecting plug with a resistance capability such as this is likewise described in U.S. Pat. No. 7,744,288 B2. In this case, sealing means may be arranged in or on the first connecting device and/or on the connecting plug with a resistance capability, such that, when the connecting plug with a resistance capability is connected to the first connecting device, the fiber-optic adapter is sealed in the area of the first connecting device against external environmental influences, in particular moisture. This therefore precludes or minimizes the ingress of moisture through the first connecting device of the fiber-optic adapter from an outdoor area.

Furthermore, the first and the second connecting devices are different or of different types. The fiber-optic adapter is therefore used to connect two glass fiber cables which are terminated with different types of connecting or end plugs.

The fiber-optic adapter has at least one first adapter-side attachment means. The first adapter-side attachment means is in this case not an element of a connecting device. The first adapter-side attachment means is in the form of an external thread with a first adapter-side nominal diameter. The external thread may in this case be arranged on a part of an outer surface or of an outer casing of the fiber-optic adapter. By way of example, the external thread allows a push-on or attachment nut to be screwed onto the fiber-optic adapter. This push-on or attachment nut can be used for mechanically fixing the fiber-optic adapter on an adapter holder (see U.S. Pat. No. 7,744,288 B2).

SUMMARY

According to the invention, the connection arrangement furthermore comprises an adapter sleeve. The adapter sleeve has a first end section with a first opening and a second end section with a second opening. Furthermore, the adapter sleeve has an internal volume which is accessible through the first and the second openings. The adapter sleeve may at least partially be in the form of a hollow cylinder. In particular, the first opening can be arranged in a cover surface of the hollow cylinder, and/or the second opening can be arranged in a base surface of the hollow cylinder. However, in this case, the first and/or the second end sections may differ from an ideal hollow-cylindrical shape.

The first end section has a first sleeve-side attachment means, with the first sleeve-side attachment means being in the form of a first internal thread. In this case, the internal thread can bound the first opening. Furthermore, a central longitudinal axis of the internal thread may be the same as a central longitudinal axis of the adapter sleeve. For example, if a part of the first end section is in the form of a hollow cylinder, then the internal thread can be arranged on an inner surface of the hollow cylinder.

The internal thread has a first sleeve-side nominal diameter. The first sleeve-side nominal diameter corresponds to the first adapter-side nominal diameter, with the adapter sleeve being screwed onto the adapter-side external thread such that at least the second connecting device is arranged in an internal volume in the adapter sleeve. In this case, the fiber-optic adapter projects at least partially, preferably with the inner section of the fiber-optic adapter as defined above, through the first opening into the internal volume in the adapter sleeve. The collaborating or interacting adapter-side external thread and sleeve-side internal thread are used for mechanical fixing and alignment of the adapter sleeve with respect to the fiber-optic adapter. In addition, the thread makes it possible to absorb predetermined tensile and compressive forces which act on the proposed connection arrangement.

An internal diameter of the adapter sleeve and dimensions of the internal volume are in this case chosen such that at least a part of the fiber-optic adapter, preferably the inner section, and preferably furthermore the second connecting device, can be arranged completely within the adapter sleeve.

A second connecting plug can then be introduced into the internal volume through the second opening, and can be connected to the second connecting device. It is also feasible for dimensions, in particular a diameter of the second opening, to be chosen such that only a glass fiber cable which has been terminated with the second connecting plug can be passed out of the adapter sleeve. In this case, the second connecting plug is or can also be arranged completely in the internal volume of the adapter sleeve. In particular, dimensions, in particular a diameter, of the second opening may be chosen to be greater than or equal to external dimensions, in particular greater than or equal to an external diameter, of the glass fiber cable which has been terminated with the second connecting plug, but less than maximum external dimensions of the second connecting plug. Sealing elements or sealing means can also be arranged in the area of the second end section, allowing fluid-tight insertion, introduction or entry of the second connecting plug or of the glass fiber cable which has been terminated with the second connecting plug into the internal volume.

This advantageously results in a fiber-optic connection arrangement which allows glass fiber cables to be connected such that they are protected against environmental influences, in particular moisture. In this case, in particular, an area of the second connecting device, in particular an inner section of the fiber-optic adapter, is also better protected against external (environmental) influences. This advantageously allows that part of the fiber-optic adapter which has the second connecting device to be arranged in indoor areas where the humidity is relatively high, for example in basements of a building, or even allows the part which has the second connecting device to be arranged in an outdoor area, that is to say outside buildings. This widens the range of use of the fiber-optic adapter in an advantageous manner, without modifying a design of the fiber-optic adapter.

In a further embodiment, the second end section has a second sleeve-side attachment means or a sleeve-side connecting device. The second end section may be arranged such that it is arranged opposite the first end section, along a central longitudinal axis of the adapter sleeve. A connecting or end plug of a glass fiber cable or the glass fiber cable itself can be mechanically fixed or attached to the adapter sleeve by means of the second sleeve-side attachment means or the sleeve-side connecting device, and/or can be aligned with respect to the adapter sleeve. If, as described above, the adapter sleeve is screwed onto the fiber-optic adapter and is therefore mechanically fixed to the fiber-optic adapter and aligned in a predetermined alignment with respect to the fiber-optic adapter, then this advantageously means that the connecting or end plug which has been attached to the adapter sleeve by means of the second sleeve-side attachment means or by means of the sleeve-side connecting device, or the glass fiber cable which has been attached to the adapter sleeve by means of the second attachment means or by means of the sleeve-side connecting device is also mechanically fixed or attached to the fiber-optic adapter and/or is aligned in a predetermined alignment with respect to the fiber-optic adapter, in particular with respect to the second connecting device. Furthermore, this advantageously means that tensile and/or compressive forces which are exerted on the connecting or end plug or the glass fiber cable need not be absorbed exclusively by the second connecting device, but are absorbed at least partially, and preferably completely, by the second sleeve-side attachment means or the sleeve-side connecting device.

In a further embodiment, the connection arrangement additionally comprises a sealing means, with the sealing means sealing the internal volume of the adapter sleeve in a fluid-tight manner in the area of the first opening in the adapter sleeve. In this case, therefore, the sealing means may be arranged in or on a first end section of the adapter sleeve, in particular resting on it. This advantageously prevents or minimizes the ingress of moisture through the first opening into the internal volume of the adapter sleeve.

In one preferred embodiment, the first end section of the adapter sleeve forms a first sealing surface. In this case, the sealing surface can be used as a contact surface for the sealing means mentioned above. In particular, the sealing means may be a sealing washer which rests at least partially, and preferably completely, on the first sealing surface. In this case, the sealing surface may be annular, with the sealing surface being arranged on a plane which is arranged at right angles to the central longitudinal axis of the adapter sleeve. By way of example, the fiber-optic adapter may have a flange which, for example, separates the outer section, as explained above, of the fiber-optic adapter from the inner section of the fiber-optic adapter. In this case, the flange may bound or terminate the adapter-side external thread on one side. In particular, the flange can be arranged on the adapter at a rear end of the adapter-side external thread in the screwing-on direction. When the adapter sleeve is now screwed onto the fiber-optic adapter with, for example, sealing means arranged in the first end section, for example with a sealing washer placed adjacent to or on the first sealing surface, then the first sealing surface can press the sealing means, in particular the sealing washer, onto or against the flange.

In a further embodiment, marking elements are arranged on the second end section of the adapter sleeve. The marking elements or the marking element are or is used for correct insertion, introduction or entry of a connecting plug into the adapter sleeve and into the second connecting device, which is arranged in the internal volume of the adapter sleeve. This advantageously makes it possible to assist correct alignment of the connecting plug in the second connecting device. In this case, thread pitches on the adapter-side external thread and on the first sleeve-side internal thread can be matched to one another such that the adapter sleeve assumes a predetermined position with respect to the fiber-optic adapter when screwed completely onto the fiber-optic adapter. This likewise predetermines an alignment and position of the adapter sleeve with respect to the fiber-optic adapter, and therefore also with respect to the second connecting device.

Alternatively or cumulatively, the adapter sleeve may have one or more guide means, or these guide means may be arranged on the adapter sleeve. In this case, guide means means, for example, physically embodied guide means, such as guide slots, guide grooves, guide webs and guide walls. The guide means is or are preferably arranged on the adapter sleeve such that a connecting plug, in particular a connecting plug with a predetermined form or a predetermined embodiment, can be inserted, introduced or enter into the internal volume of the adapter sleeve, and therefore also into the second connecting device of the fiber-optic adapter, in only one predetermined position of orientation through the second opening in the adapter sleeve. This advantageously prevents or reduces incorrect insertion, introduction or entry of a connecting plug when the adapter sleeve is screwed on.

In a further embodiment, the fiber-optic adapter has a second adapter-side attachment means for attachment or fixing of the first connecting plug to the fiber-optic adapter. The second adapter-side attachment means is therefore used for mechanical fixing and possibly alignment of a connecting plug which has been inserted, introduced or entered into the first connecting device. For this purpose, as is described in U.S. Pat. No. 7,744,288 B2, the first connecting plug may have attachment means which correspond to the second adapter-side attachment means.

The second sleeve-side attachment means is likewise designed for attachment of a first connecting plug to the adapter sleeve. This likewise allows a connecting plug to be attached or fixed, and possibly aligned, to the adapter sleeve, in particular to the second end section of the adapter sleeve, which connecting plug is physically the same or is of the same type as the connecting plug which can be inserted, introduced or entered into the first connecting device. This allows the proposed fiber-optic connection arrangement to advantageously make a mechanical and optical connection between two glass fiber cables which are terminated by physically identical connecting plugs. For example, if the first connecting plug is a connecting plug with a resistance capability for use in an outdoor environment, then the proposed fiber-optic connection arrangement can be used to connect a glass fiber cable which has been terminated by this connecting plug which has a resistance capability to a further glass fiber cable which has likewise been terminated by a connecting plug such as this which has a resistance capability. Therefore, by screwing on the adapter sleeve and by means of the fiber-optic connection arrangement created in this way, the fiber-optic adapter can also be used for connection of glass fiber cables in an outdoor area, and not only in the area of the junctions from an outdoor area to an indoor area. This advantageously widens the field of use of the fiber-optic adapter.

The second sleeve-side attachment means may in this case be designed such that a first connecting plug, which is attached by means of the second sleeve-side attachment means, is arranged in a predetermined position and orientation in the second connecting device, in particular by being inserted, introduced or entered into it. The second connecting device is, as explained above, not designed, or is only partially designed, for mechanical fixing and alignment of a first connecting plug. In order nevertheless to make a functional fiber-optic connection between the glass fiber cables which have been terminated by the two connecting plugs of the same type, the second sleeve-side attachment means can now at least partially carry out the function of mechanical fixing and alignment, with a first connecting plug, which has been attached by means of the second sleeve-side attachment means, being able to project into the second connecting device of the fiber-optic adapter, for example in such a way that a fiber-optic connection is or can be made.

In one preferred embodiment, the fiber-optic adapter has a second adapter-side attachment means, with the second adapter-side attachment means being in the form of an internal thread with a second adapter-side nominal diameter. The second sleeve-side attachment means is likewise in the form of an internal thread with a second sleeve-side nominal diameter, with the adapter-side nominal diameter being the same as the second sleeve-side nominal diameter.

As U.S. Pat. No. 7,744,288 B2 describes, a first connecting plug, for example a connecting plug with a resistance capability, may have an attachment nut which can rotate and can rotate about a housing of the connecting plug which has a resistance capability. This attachment nut which can rotate may have a threaded section with an external thread, with the external thread (plug-side external thread) having a nominal diameter which corresponds to the nominal diameter of the second adapter-side attachment means, which is in the form of an internal thread. This allows the connecting plug which has a resistance capability to be mechanically firmly attached to the fiber-optic adapter by screwing the attachment nut to the fiber-optic adapter.

If the adapter sleeve now has an internal thread with identical dimensions in particular on the second end section of the adapter sleeve, then the plug-side external thread on a connecting plug which has a resistance capability, and therefore the connecting plug per se, can be screwed to the adapter sleeve, and can therefore be firmly attached to the adapter sleeve.

U.S. Pat. No. 7,744,288 B2 describes that a connecting plug which has a resistance capability may also have a sealing means, in particular a sealing washer, which is pressed against a stop or contact surface, which acts as a sealing surface, when the plug-side external thread is screwed into the adapter-side internal thread. This prevents moisture from being able to enter the fiber-optic adapter from the outside through the first connecting device.

The adapter sleeve can preferably likewise have a contact or stop surface, which acts as a second sleeve-side sealing surface, in the area of the second end section. A sealing means which is arranged, for example, on a connecting plug, for example a connecting plug with a resistance capability, but which may also be in the form of a separate component, may in this case be pressed into the second sleeve-side internal thread between a housing of the plug and the stop or contact surface when the connecting plug is introduced, in particular screwed in. If, as described above, the adapter sleeve is screwed onto the fiber-optic adapter to form a seal, then this advantageously means that an internal volume is sealed completely or better against environmental influences, in particular moisture, even in the area of the second opening. If a connecting plug is also introduced into the first connecting device, forming a seal, then this advantageously completely seals the fiber-optic connection against the ingress of moisture, or protects it better.

In a further embodiment, the first connecting device is a connecting device for so-called DLX™ plugs, and/or the second connecting device is a connecting device for so-called SC plugs. Reference is in this case made to U.S. Pat. No. 7,744,288 B2, in particular with reference to the configuration of a DLX™ plug. The connecting devices may, of course, also be connecting devices for further plug types for glass-fiber connection technology. This advantageously means simple connection of glass-fiber cables which are terminated by plugs of the same or different type, which already exist.

An adapter sleeve for a fiber-optic connection arrangement is also proposed. The connection arrangement comprises a fiber-optic adapter, with the fiber-optic adapter having a first connecting device for a first connecting plug and a second connecting device for a connecting plug. The first and the second connecting devices are in this case different or of different type. The fiber-optic adapter has at least one first adapter-side attachment means, with the first adapter-side attachment means being in the form of an external thread with a first adapter-side nominal diameter.

According to the invention, the adapter sleeve has a first end section with a first opening and a second end section with a second opening. The first end section has a first sleeve-side attachment means, with the first sleeve-side attachment means being in the form of a first internal thread. The internal thread has a first sleeve-side nominal diameter, with the first sleeve-side nominal diameter corresponding to the first adapter-side nominal diameter. The adapter sleeve can be screwed onto the adapter-side external thread such that at least the second connecting device can be arranged in an internal volume in the adapter sleeve.

The first internal thread may have a predetermined nominal diameter.

This advantageously results in an adapter sleeve which can be used to make one of the fiber-optic connection arrangements described above.

The adapter sleeve may, of course, also be arranged on the fiber-optic adapter by means of attachment means of a different type, such that the second connecting device can be arranged in an internal volume of the adapter sleeve. By way of example, the adapter sleeve may also be latched or clamped onto the fiber-optic adapter. For this purpose, the adapter sleeve may comprise suitable attachment means, for example latching and/or clamping elements. In addition, the fiber-optic adapter may be modified such that it has corresponding attachment elements, for example corresponding latching and/or clamping elements.

BRIEF DESCRIPTION OF THE DRAWINGS

The invention will be explained in more detail with reference to one exemplary embodiment. In the figures.

DETAILED DESCRIPTION

In the following text, the same reference symbols denote elements having the same or similar technical characteristics.

Figure 1:
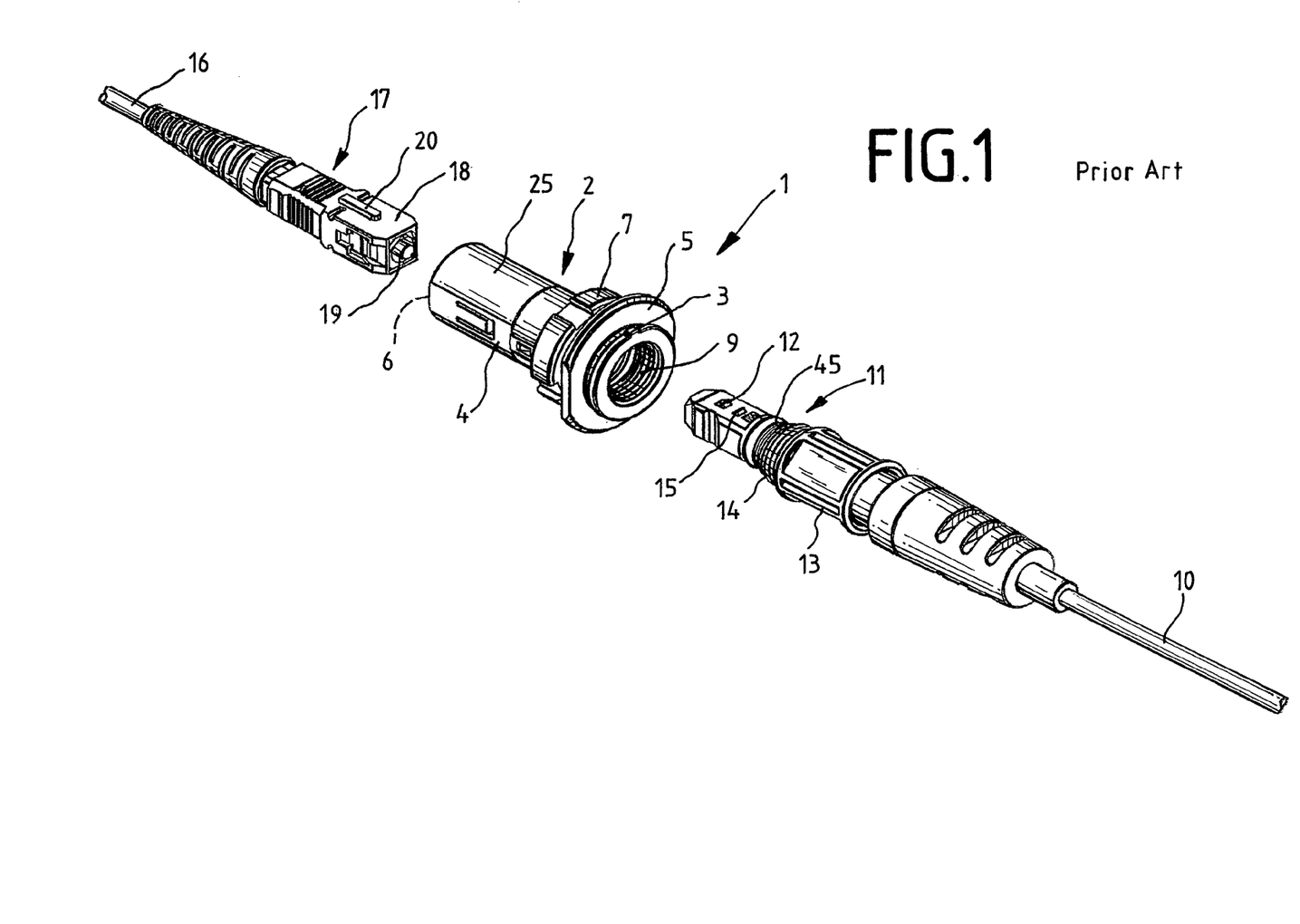
FIG. 1 shows an exploded drawing of a fiber-optic connection arrangement (prior art)

FIG. 1 shows an exploded drawing of a fiber-optic connection arrangement 1 according to the prior art. The fiber-optic connection arrangement 1 comprises a fiber-optic adapter 2. The fiber-optic adapter 2 has an outer section 3 and an inner section 4, which are separated by a flange 5, which is circumferential around a housing 25 of the fiber-optic adapter 2. Furthermore, the fiber-optic adapter 2 has a first connecting device 38 (see FIG. 4), which is not illustrated in FIG. 1, within the housing 25 of the fiber-optic adapter 2, and a second connecting device 6. An attachment nut 7 is also illustrated, and is screwed onto an external thread 8 (see FIG. 2) on the fiber-optic adapter 2. The external thread 8 may in this case be referred to as first adapter-side attachment means. Furthermore, the fiber-optic adapter 2 has a second attachment means, in the form of an internal thread 9.

A first glass fiber cable 10 is also illustrated, which is terminated by a first connecting plug 11. The first connecting plug 11 may be a connecting plug with a resistance capability. The first connecting plug 11 has a plug head 12 in which a ferrule 22 (see FIG. 4) for the first glass fiber cable 10 is arranged. Furthermore, the first connecting plug 11 has an attachment nut 13, which has or forms an external threaded section 14. The first connecting plug 11 can be inserted into the fiber-optic adapter 2 through an opening which forms the internal thread 9, with the plug head 12 being inserted into the first connecting device 38, which is not illustrated. For this purpose, the plug head 12 has guide elements 15 which, for example, correspond to guide elements, for example guide grooves, in the first connecting device 38. When the plug head 12 has been inserted into the first connecting device 38, the plug-side external thread 14 can be screwed into the adapter-side internal thread 9 by rotation of the attachment nut 13. A sealing washer 45 is also illustrated, and is explained in more detail in FIG. 5.

A second glass fiber cable 16 is likewise illustrated, which is terminated by a second connecting plug 17. In this case, the second connecting plug 17 is of a different type to the first connecting plug 11. The second connecting plug 17 likewise has a plug head 18, which comprises a ferrule 19 for the second glass fiber cable 16. The plug head 18 can be inserted into the second connecting device 6. For this purpose, the second connecting plug 17 has guide elements which are in the form of guide webs 20 and correspond to guide slots or guide grooves 23 (see FIG. 2) in the second connecting device 6.

Figure 2:
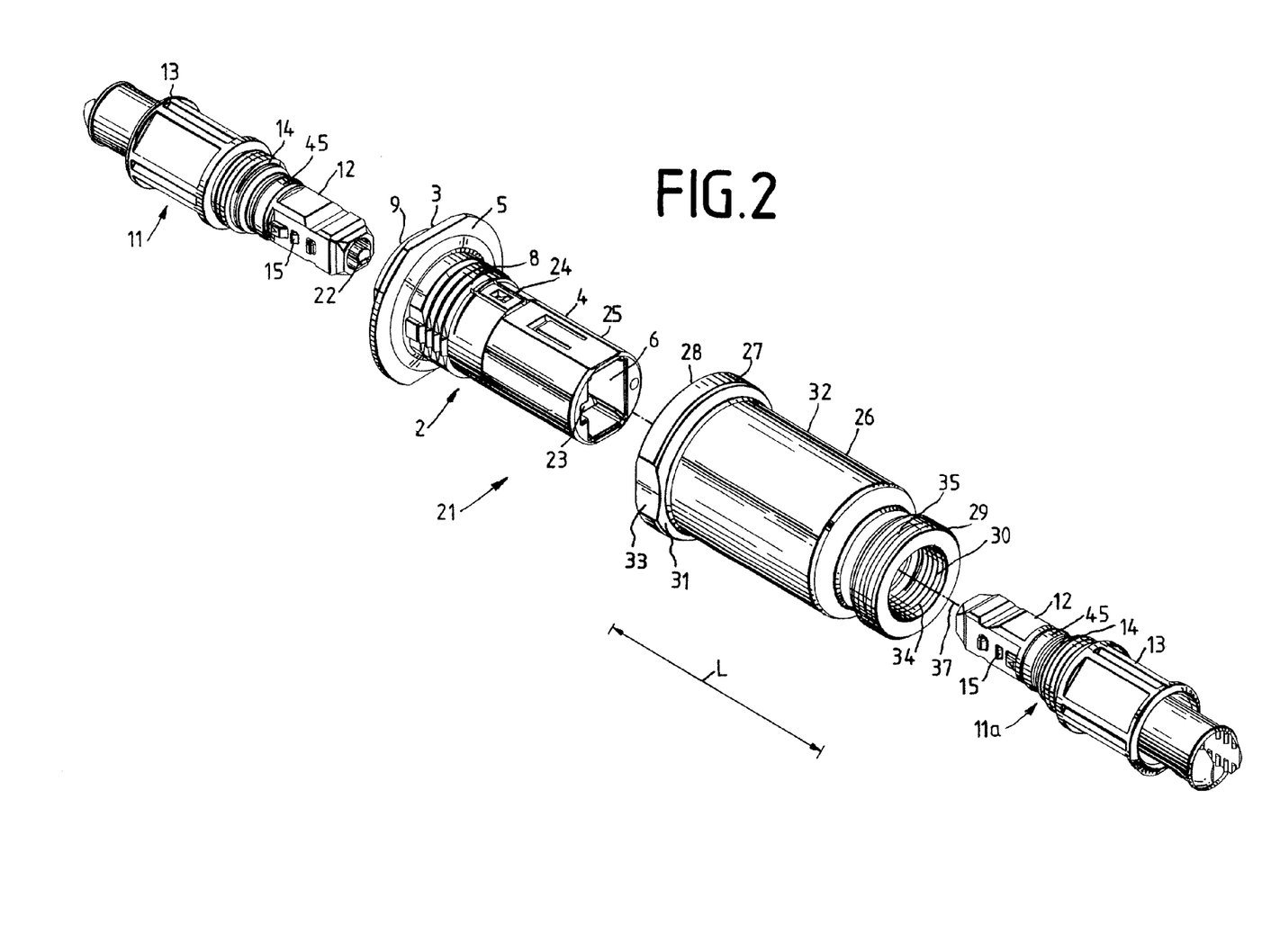
FIG. 2 shows an exploded drawing of a fiber-optic connection arrangement according to the invention.

A mechanical and optical connection between two glass fiber cables 10, 16 which are terminated in different ways can thus be made by means of the illustrated fiber-optic adapter 2, with the connecting plugs 11, 17 assuming predetermined alignments for the connection. FIG. 2 shows an exploded drawing of a fiber-optic connection arrangement 21 according to the invention. The fiber-optic connection arrangement 21 comprises the fiber-optic adapter 2 illustrated in FIG. 1. The first connecting plug 11 is also illustrated, and is likewise illustrated in FIG. 1.

However, in contrast to FIG. 1, a ferrule 22 is illustrated in the first connecting plug 11, and a guide groove 23 in the second connecting device 6. The external thread 8, which is concealed in FIG. 1, is also illustrated on the fiber-optic adapter 2. As can be seen in this case, the external thread 8 is arranged on an outer casing surface 24 of the housing 25 of the fiber-optic adapter 2. In this case, the external thread 8 is arranged on the inner section side, and is bounded by a flange 5.

An adapter sleeve 26 according to the invention is also illustrated. The adapter sleeve 26 has a first end section 27 with a first opening 28 and a second end section 29 with a second opening 30. An internal volume 47 (see FIG. 5), which is not illustrated, in the adapter sleeve 26 is accessible through the first opening 28 and the second opening 30. The adapter sleeve 26 is hollow for this purpose. The figure also shows that a part of the first end section 27 is in the form of a flange 31, with the flange 31 projecting in an annular shape from a main body 32 of the adapter sleeve 26. This illustrates that the flange 31 has flats 33 on an outer circumference, which flats 33 are used for better manual operation, in particular for better operation for screwing up or unscrewing the adapter sleeve 26.

The figures also illustrate that the second end section 29 has an internal thread 34, with the internal thread 34 surrounding the second opening 30. In this case, a diameter of the second opening 30 is less than a diameter of the first opening 28. The external dimensions, in particular an external diameter, of the adapter sleeve 26 tapers from the first end section 27 toward the second end section 29. An annular groove 35, which is arranged on an external circumference of the second end section 29, is also illustrated, for holding a closure cap holder (not illustrated). A further first connecting plug 11a is also illustrated, of the same type as the first connecting plug 11. In particular, the further first connecting plug 11a also has an attachment nut 13 and an external thread 14 connected to the attachment nut 13.

A nominal diameter of the sleeve-side internal thread 34 corresponds to a nominal diameter of the plug-side external thread 14. A plug head 12 of the further first connecting plug 11a can thus be inserted into the internal volume 47 of the adapter sleeve 26 through the second opening 30. The first further plug connector 11a can thus be screwed by means of the external thread 14 to the internal thread 34, by rotation of the attachment nut 13, thus mechanically fixing the first further connecting plug 11a to the adapter sleeve 26.

A first internal thread 35 on the adapter sleeve 26, arranged in the first end section 27 (see for example FIG. 4), is not illustrated in FIG. 2. A nominal diameter of the first internal thread 35 corresponds to a nominal diameter of the external thread 8. The adapter sleeve 26 can thus be screwed onto the fiber-optic adapter 2 by means of the interacting threads 8, 35, with the second connecting device 6 being arranged in the internal volume 47 of the adapter sleeve 26. A length L of the adapter sleeve 26 along a central longitudinal axis 37 of the adapter sleeve 26 is in this case matched to a length, which is not illustrated, of the fiber-optic adapter 2 and of the first further connecting plug 11a such that, when the adapter sleeve 26 is screwed onto the fiber-optic adapter 2, the plug head 12 of the first further connecting plug 11a can be inserted into the second connecting device 6. In this case, it should be noted that the plug head 12 can be mechanically fixed and aligned only incompletely by means of the second connecting device 6. The mechanical fixing of the first further connecting plug 11a is in this case assisted by screwing the plug-side external thread 14 to the sleeve-side second external thread 34, wherein the plug head 12 of the first further connecting plug 11a assumes a predetermined position, and also preferably a predetermined orientation, within the second connecting device 6 when the adapter sleeve 26 is screwed on and the further first connecting plug 11a is screwed in.

In this case, it should be noted that the flange 5 acts as a stop for the sleeve-side flange 31, as a result of which the adapter sleeve 26 can be screwed onto the fiber-optic adapter 2 only to a certain extent.

Figure 3:
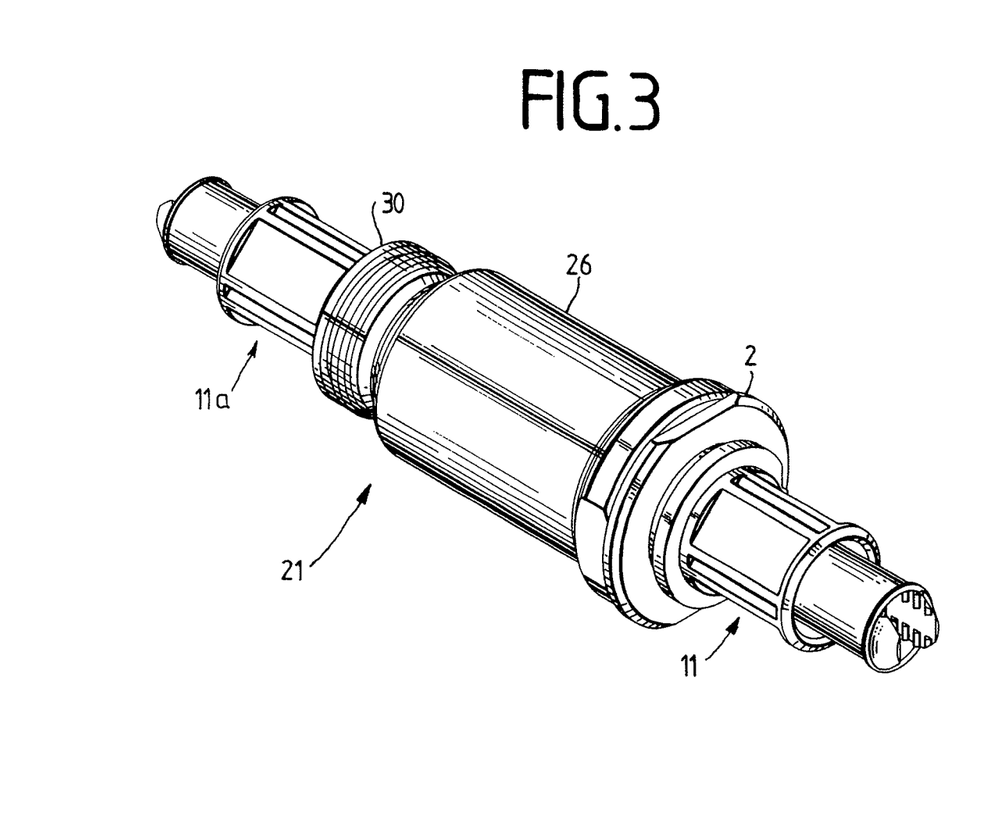
FIG. 3 shows a perspective view of a fiber-optic connection arrangement.

FIG. 3 illustrates the fiber-optic connection arrangement 21 as shown in FIG. 2 in a screwed-together state, with the connection arrangement 21 being illustrated rotated through 180°. In this case, the first connecting plug 11 has been inserted into a first connecting device 38 (see FIG. 4), which is not illustrated, of the fiber-optic adapter 2, and has been screwed to the fiber-optic adapter 2. At the same time, a first further connecting plug 11a is introduced into an internal volume 47 (see FIG. 4), which is not illustrated, in the adapter sleeve 26, and is inserted into the second connecting device 6, which is illustrated, for example, in FIG. 1. Furthermore, the first further connecting plug 11a is screwed to the adapter sleeve 26. This allows a mechanical and optical connection for glass fiber cables which have been terminated with the first connecting plugs 11, 11a.

Figure 4:
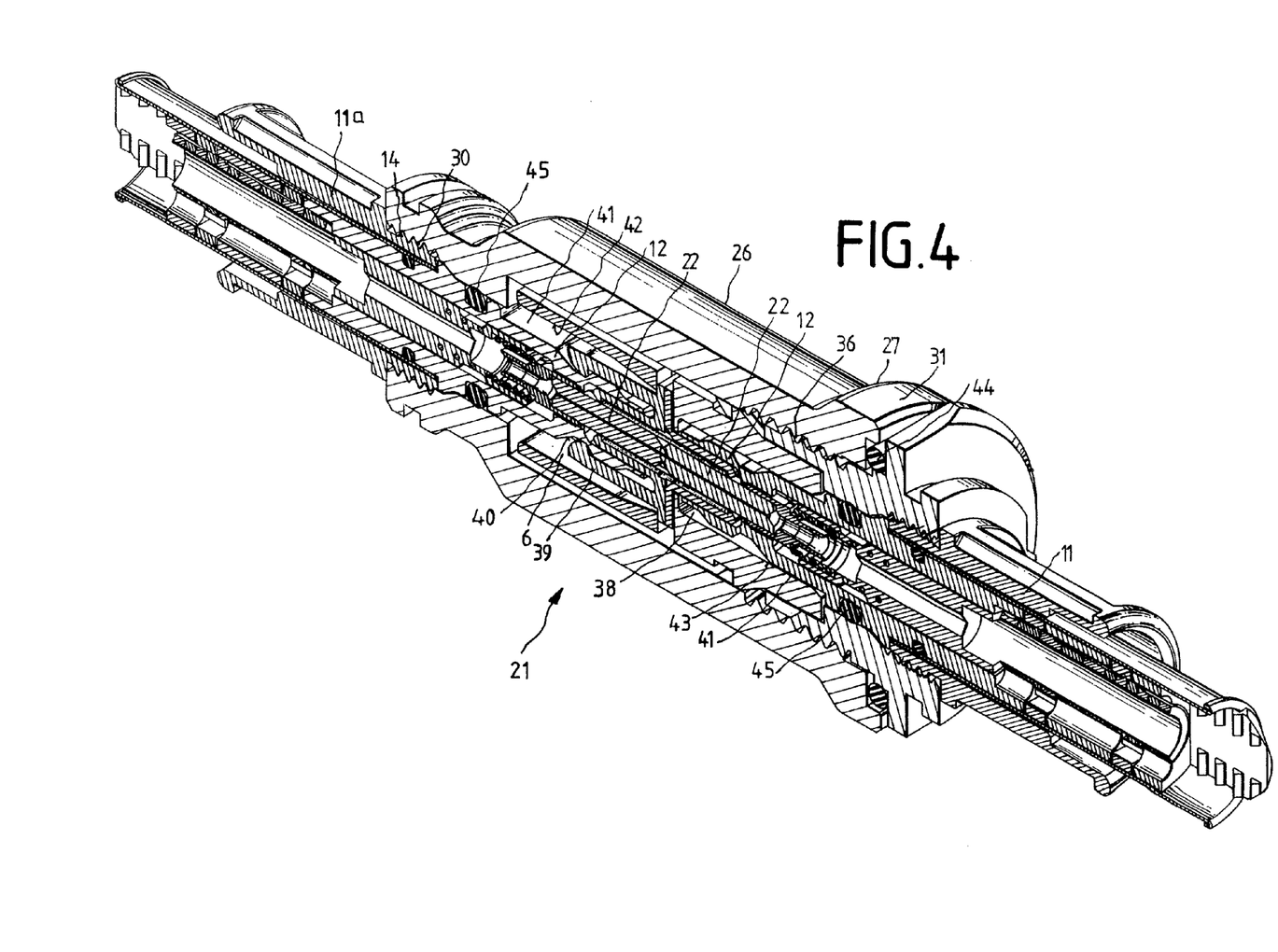
FIG. 4 shows a perspective view of a section through the fiber-optic connection arrangement as shown in FIG. 3.

FIG. 4 shows a perspective illustration of a cross section through the fiber-optic connection arrangement 21 illustrated in FIG. 3. FIG. 4 illustrates a first connecting device 38, in which, in the present case, the plug head 12 of the first connecting plug 11 has been inserted. The figure also shows the second connecting device 6, into which the plug head 12 of the first further connecting plug 11a is introduced. As can be seen, latching hooks 39 on the second connecting device 6 engage in latching depressions 40 in the plug head 12 of the first further connecting plug 11a. When the first further connecting plug 11a has been inserted into the second connecting device 6 in this way, guide elements 15 on the first further connecting plug 11a are introduced into the guide groove 23 in the second connecting device 6 (see FIG. 2). The guide elements 15 of the first further connecting plug 11a and the guide groove 23 in the second connecting device are therefore used for predetermined alignment of the first further connecting plug 11a in the second connecting device 6. At the same time, however, an outer surface 41 of the plug head 12 of the first further connecting plug 11a is at a distance from an inner surface 42 of the second connecting device 6, after having been introduced into the latter. In contrast to this, an outer surface 41 of the plug head 12 of the first connecting plug 11 is flush with an inner surface 43 of the first connecting device 38. In consequence, the first further connecting plug 11a is mounted only incompletely in the second connecting device 6 since it can still be pivoted when it is attached only by means of the latching hooks 39. In this case, in fact, the latching hooks 39 and the guide groove 23 which is illustrated in FIG. 2 are used only for a predetermined and desired alignment of the first further connecting plug 11a in the second connecting device 6, and only partially for its mechanical fixing in the second connecting device 6. The mechanical fixing is produced by screwing the plug-side external thread 14 to the second sleeve-side internal thread 30. This ensures that the first further connecting plug 11a can be arranged mechanically fixed in a predetermined alignment as well in the second connecting device 6, which is not designed for complete mechanical fixing of a first connecting plug 11, 11a. This makes it possible to ensure a defined separation and a defined alignment of ferrules 22 on the first connecting plugs 11, 11a.

Sealing washers 44, 45 are also illustrated, and will be explained in more detail in the following text.

Figure 5:
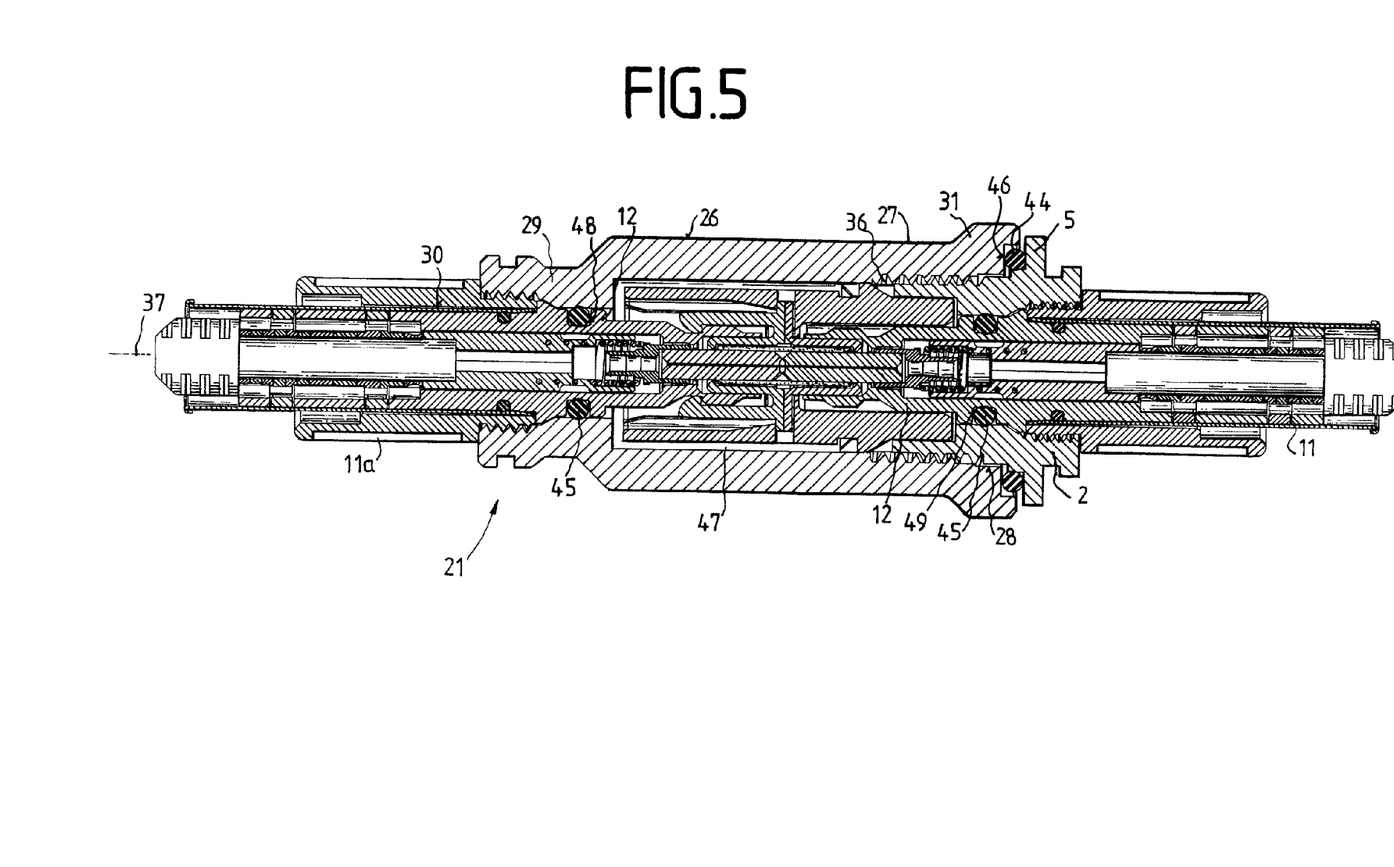
FIG. 5 shows a cross section through the fiber-optic connection arrangement as illustrated in FIG. 3.

FIG. 5 shows a cross section through the fiber-optic connection arrangement 21 illustrated in FIG. 3. A first sealing washer 44 and second sealing washers 45 are illustrated in this case. The sleeve-side flange 31 forms an annular contact surface 46, which is bounded by the first flange 31 on an external circumference of the first sealing surface 46. The first opening 28 has a cross section in the form of a staircase and is incorporated in the end section 27 which comprises the first internal thread 36 and the flange 31. In this case, the sealing surface 46 is arranged on a plane which runs at right angles to the central longitudinal axis 37 of the adapter sleeve 26. In this case, the sealing surface 46 has a predetermined internal diameter and a predetermined external diameter. When the adapter sleeve 26 is screwed onto the fiber-optic adapter 2, then the sealing washer 44 is pressed between the sleeve-side sealing surface 46 and the adapter-side flange 5, thus sealing an internal volume 47 of the adapter sleeve 26 in a fluid-tight manner, in the area of the connection between the adapter sleeve 26 and the fiber-optic adapter 2.

Sealing washers 45 are arranged on the first connecting plugs 11, 11a. When the first further connecting plug 11a is screwed into the second opening 30 in the adapter sleeve 26, the sealing washer 45 is pressed between a further sealing surface 48 on the adapter sleeve 26 and the plug head 12 of the first further connecting plug 11a. An internal diameter of at least a part of the second end section 29 of the adapter sleeve 26 should be chosen for this purpose such that it is less than an external diameter of the sealing washer 45 which is arranged on the first further connecting plug 11a. This advantageously means that the internal volume 47 in the adapter sleeve 26 is sealed in a fluid-tight manner when a first further connecting plug 11a is screwed in. Analogously to this, a fluid-tight seal is provided by means of the sealing washer 45, which is arranged on the first connecting plug 11. In this case, the fiber-optic adapter 2 has a sealing surface 49 in the area of the first connecting device 38. When the first connecting plug 11 is screwed into the internal thread 9 in the fiber-optic adapter 2, the sealing washer 45 is pressed between the sealing surface 49 and the plug head 12 of the first connecting plug 11.

The first end section 27 is in this case arranged opposite the second end section 29 along a central longitudinal axis 37 of the adapter sleeve 26.

That part of the second end section 29 on which the sealing washer 45 rests when the first further connecting plug 11a is in the screwed-in state may be referred to as a further sealing surface 48 of the adapter sleeve 26.

LIST OF REFERENCE SYMBOLS

1 Fiber-optic connection arrangement
2 Fiber-optic adapter
3 Outer section
4 Inner section
5 Flange
6 Second connecting device
7 Attachment nut
8 External thread
9 Internal thread
10 First glass fiber cable
11 First connecting plug
12 Plug head
13 Attachment nut
14 External thread
15 Guide element
16 Second glass fiber cable
17 Second connecting plug
18 Plug head
19 Ferrule
20 Guide web
21 Fiber-optic connection arrangement
22 Ferrule
23 Guide groove
24 Outer casing
25 Housing
26 Adapter sleeve
27 First end section
28 First opening
29 Second end section
30 Second opening
31 Flange
32 Main body
33 Flat
34 Internal thread
35 Annular groove
36 Internal thread
37 Central longitudinal axis
38 First connecting device
39 Latching hook
40 Latching depression
41 Outer surface of the first further connecting plug
42 Inner surface
43 Inner surface of the first connecting device
44 Sealing washer
45 Sealing washer
46 First sealing surface
47 Internal volume
48 Further sealing surface
49 Sealing surface

The invention claimed is:

1. An optical coupling arrangement for optically coupling first and second ruggedized optical connectors, the optical coupling arrangement comprising:
a body arrangement defining first and second in-line ports;
an alignment structure disposed within the body arrangement and accessible through the in-line ports, the alignment structure being configured to align optical fibers of the first and second ruggedized optical connectors;
a first attachment structure disposed at the first port, the first attachment structure being configured to engage with a rotatable fastening element of the first ruggedized optical connector when the first ruggedized optical connector is received at the first port, the first attachment structure also including a surface against which a seal abuts when the first ruggedized optical connector is engaged with the first attachment structure; and
a second attachment structure disposed at the second port, the second attachment structure being configured to engage with a rotatable fastening element of the second ruggedized optical connector when the second ruggedized optical connector is received at the second port.

2. The optical coupling arrangement of claim 1, wherein the first attachment structure includes internal threads.

3. The optical coupling arrangement of claim 2, wherein the second attachment structure includes internal threads.

4. The optical coupling arrangement of claim 1, wherein the alignment structure includes latching arms.

5. The optical coupling arrangement of claim 1, further comprising:
- the first ruggedized optical connector received at the first port;
- the second ruggedized optical connector received at the second port;
- a first seal member disposed between an exterior of the first ruggedized optical connector and the body arrangement; and
- a second seal member disposed between an exterior of the second ruggedized optical connector and the body arrangement.

6. The optical coupling arrangement of claim 5, wherein the first and second seal members are carried by the first and second ruggedized optical connectors.

7. The optical coupling arrangement of claim 5, wherein the first and second seal members include sealing washers.

8. The optical coupling arrangement of claim 1, wherein the body arrangement includes an adapter body and a sleeve body that attach together.

9. The optical coupling arrangement of claim 8, wherein the adapter body is threadably attached to the sleeve body.

10. The optical coupling arrangement of claim 8, further comprising a sealing member disposed between the adapter body and the sleeve body.

11. The optical coupling arrangement of claim 8, wherein the sleeve body defines the first attachment structure and the adapter body defines the second attachment structure.

12. The optical coupling arrangement of claim 1, wherein the first port of the body arrangement is configured to receive a DLX-type connector.

13. The optical coupling arrangement of claim 1, wherein the second port of the body arrangement is configured to receive a DLX-type connector.

\* \* \* \* \*